United States Patent

Kim et al.

Patent Number: 5,841,259
Date of Patent: Nov. 24, 1998

[54] VACUUM CLEANER AND CONTROL METHOD THEREOF

[75] Inventors: Ji-Hyun Kim; Suk-Jin Han, both of Suwon; Jae-Bong Lee, Seoul, all of Rep. of Korea

[73] Assignee: Samsung Electronics Co., Ltd., Suwon, Rep. of Korea

[21] Appl. No.: 633,375

[22] Filed: Apr. 17, 1996

Related U.S. Application Data

[62] Division of Ser. No. 287,272, Aug. 8, 1994.

[30] Foreign Application Priority Data

Aug. 7, 1993 [KR] Rep. of Korea ................ 93-15373

[51] Int. Cl.$^6$ .............. B64C 13/18; A47L 9/00; B65H 75/48; H02G 11/00
[52] U.S. Cl. ............... 318/587; 15/323; 15/340.1; 180/169; 191/12.2 A; 242/374; 242/390.8; 242/422.3; 318/283; 318/286
[58] Field of Search ........................... 15/323, 340.1; 242/375.1, 390.8, 390.9, 374, 422.3, 420.5; 464/58, 59, 60; 191/12.2 A, 12.4; 318/587, 286, 283; 180/169

[56] References Cited

U.S. PATENT DOCUMENTS

| | | |
|---|---|---|
| 1,100,139 | 6/1914 | Mayers ................ 191/12.2 A |
| 1,100,140 | 6/1914 | Mayers ............... 191/12.2 A X |
| 4,638,455 | 1/1987 | Mattaboni . |
| 4,962,453 | 10/1990 | Pong et al. . |
| 5,032,775 | 7/1991 | Mizuno et al. . |
| 5,086,535 | 2/1992 | Grossmeyer et al. . |
| 5,087,075 | 2/1992 | Hamaue ............... 242/375.1 X |
| 5,279,672 | 1/1994 | Betker et al. . |
| 5,341,540 | 8/1994 | Soupert et al. . |
| 5,369,347 | 11/1994 | Yoo . |
| 5,379,483 | 1/1995 | Pino . |
| 5,440,216 | 8/1995 | Kim . |
| 5,498,940 | 3/1996 | Kim et al. ............ 191/12.2 A X |
| 5,502,358 | 3/1996 | Lee ..................... 191/12.2 A X |

FOREIGN PATENT DOCUMENTS 2 273 921 7/1994 United Kingdom ............... 242/375.1

*Primary Examiner*—Michael Mansen
*Attorney, Agent, or Firm*—Burns, Doane, Swecker & Mathis, L.L.P.

[57] ABSTRACT

A vacuum cleaner is selectively operable in one of three modes, namely: an automatic self-directing mode, a remotely controlled mode, or a manual mode. The vacuum carries ultrasonic object detectors for detecting walls of a room being cleaned, as well as obstacles in the room. When in a self-directing mode, the vacuum selects a path of travel based upon a detected wall of the room as a reference, and steers itself to avoid obstacles in its path. An electric cord is automatically payed-out and retracted as the vacuum travels. A constant tension is imposed on the cord as it is payed-out or retracted by an appropriate manipulation of a spiral spring connected to the cord.

1 Claim, 11 Drawing Sheets

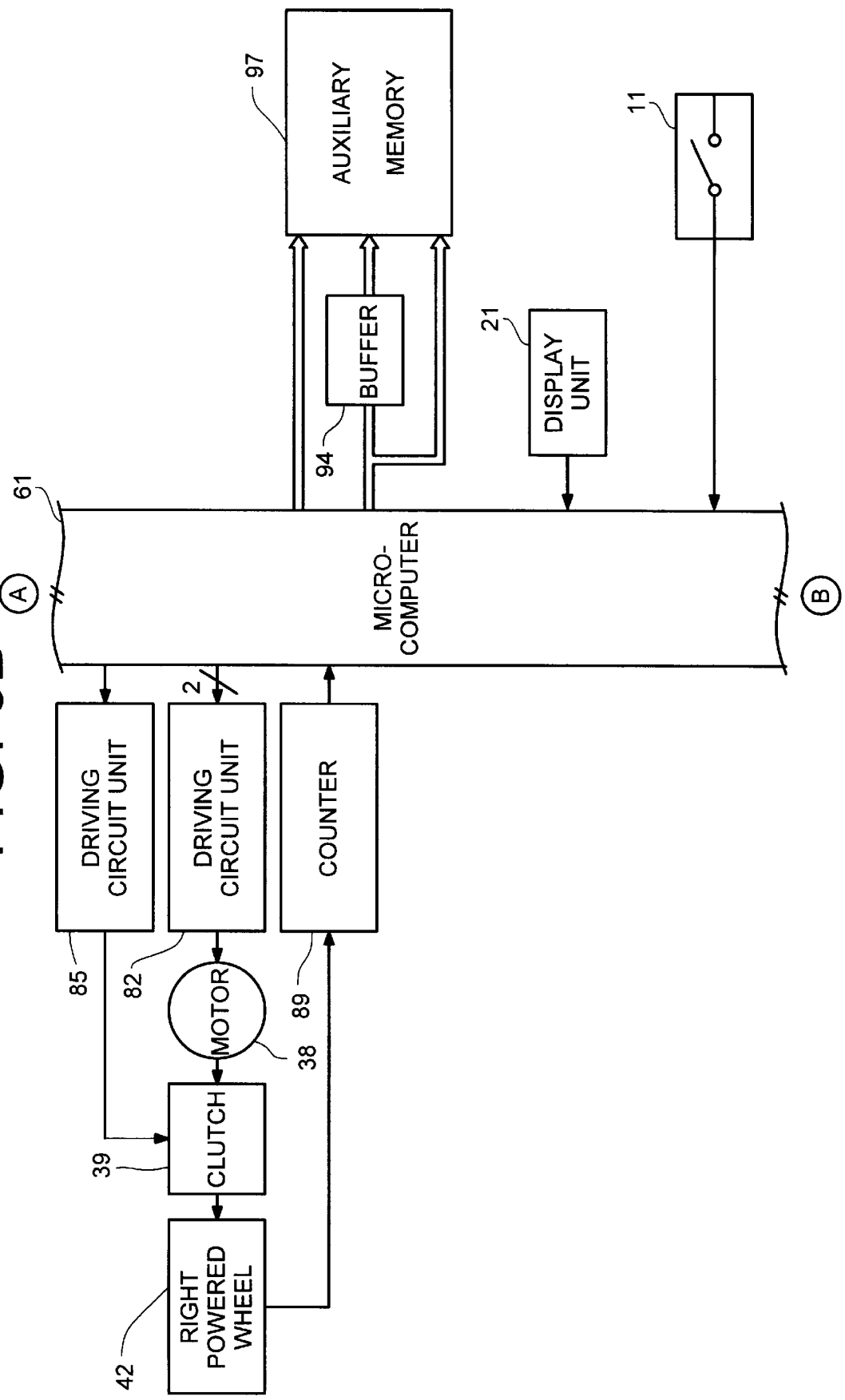

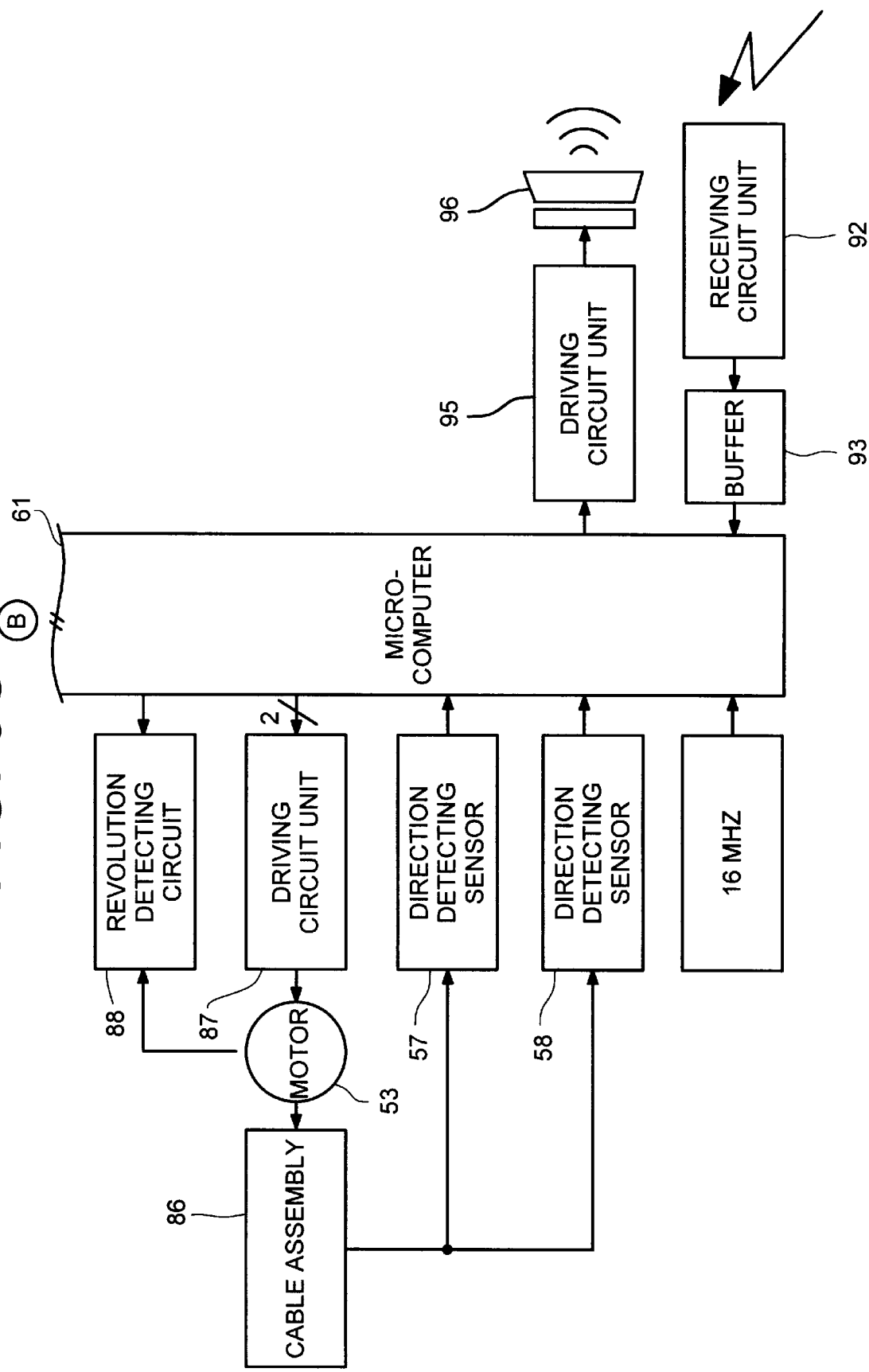

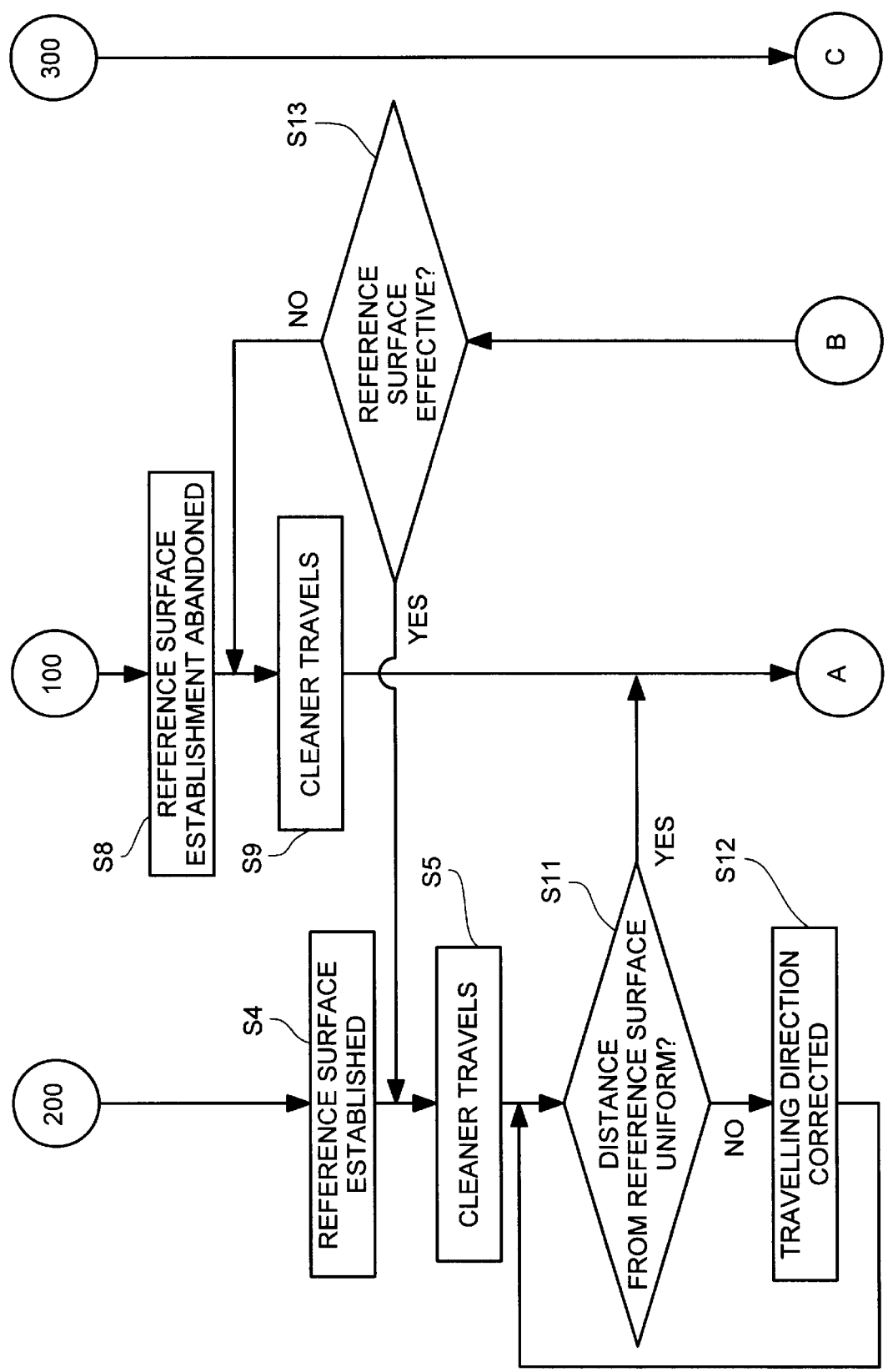

VACUUM CLEANER AND CONTROL METHOD THEREOF

This application is a division of Ser. No. 08/287,272 filed Aug. 8, 1994.

BACKGROUND OF THE INVENTION

1. Field of the Invention

The present invention relates to a vacuum cleaner, and more particularly to a vacuum cleaner for being mounted with an alternating current (AC) electric cord to thereby enable the same to perform a cleaning job automatically, manually or by remote controller.

Furthermore, the present invention relates to a control method of a vacuum cleaner for effectively cleaning a whole cleaning area by establishing a standard surface to be referenced for travelling of the cleaner.

2. Description of the Prior Art

A conventional automatic vacuum cleaner has two types, namely one with a cord and the other cordless.

The corded vacuum cleaner is mounted with a built-in power cable assembly on which an electric cord is wound and, from which the cord is extracted outside to a length enough to cover the cleaning area. The cord is then inserted into an outlet for operation of the vacuum cleaner (cleaner).

When the cleaner is operated with the cord loosely extended on a floor, it can be seen that the cleaning job can effectively be performed on a place where there is an obstacle such as a table, sofa and the like. However, the cord loosely extended can be caught by the obstacle. Moreover, when the cleaner is moved to a power source point, in other words, to a place near the outlet, with the cord disorderly and lengthily extracted on the floor, there is a problem in that the cord is caused to disturb movement of the cleaner, and to be entangled in a worst case.

The cordless vacuum cleaner is structured to have no electrical cord to thereby solve such problem as being disrupted by entanglement of the cord with the obstacle or being restricted in the size of travelling area by the cord length.

However, the cordless cleaner must be provided with an energy source, such as a battery.

Specifically, in case of using a rechargeable battery, the user should recharge the battery frequently, thereby causing restriction on the use of the cleaner.

Furthermore, there is a problem in that the cleaner is restricted in output because of a limited capacity of the battery as compared to the electricity required by a motor which is a main power consumption means.

In order to solve the aforesaid problems, there is considered a measure that the capacity of the battery should be increased. However, while the capacity of the battery is increased, there arises another problem in that the cleaner itself gets too heavy and voluminous.

Accordingly, there arises a requirement that a new vacuum cleaner should be ushered in where the advantages and disadvantages of the corded and cordless cleaner are balanced.

Meanwhile, the corded and cordless vacuum cleaner can both be automated machines. In other words, the cleaners are mounted with ultrasonic wave sensors, and according to obstacle information transmitted from the ultrasonic wave sensors, the cleaners evade the obstacle by themselves, thereby performing the cleaning jobs.

However, there arises a problem in that the cleaners thus structured repeat cleaning jobs on a restricted place while encircling the place.

Specifically, there arises a disadvantage in that there is generated a cornered place or a place where a dust collecting brush attached to the cleaner cannot cover.

In other words, there is inevitably generated a place where the cleaner should be operated manually while cleaning is performed in a house. However the conventional cordless vacuum cleaner thus mentioned, has a capacity of performing the job in only an automated mode function, thereby rendering the same impossible of being operated manually.

Accordingly, it is therefore an object of the present invention to solve the aforementioned problems by providing a vacuum cleaner having an electric cord for performing a cleaning job on a cleaning area automatically, or manually by remote controller.

Another object of the present invention is to provide a vacuum cleaner in which an AC phase power supply is used as the main driving power source to thereby free the cleaner from being restricted in its usage time and to enable the cleaner to be used continuously on a long time base.

Still another object of the present invention is to provide a vacuum cleaner capable of utilizing the ultrasonic wave sensor for effectively detecting information against wall surfaces in the cleaning area and establishing as a reference plane one of the wall surfaces to run the cleaner therein for effective cleaning of the whole cleaning area.

Still another object of the present invention is to provide a vacuum cleaner by which the cord mounted with the cleaner always maintains a predetermined tension regardless of a distance between the cleaner and the power supply point.

Still another object of the present invention is to provide a vacuum cleaner by which the whole cleaning area can be effectively cleaned without lingering in a particular area by establishing one of the wall surfaces in the cleaning area as a reference plane so that the cleaner can move according to the reference plane.

SUMMARY OF THE INVENTION

In accordance with one aspect of the present invention, there is provided a vacuum cleaner by which the aforesaid objects can be achieved, the cleaner comprising: an object detecting means for transmitting the ultrasonic waves to an object and receiving the waves reflected therefrom, so that information against whether or not there is an object in the cleaning area and information against a distance to the object can be detected; a microcomputer for being contacted by an output terminal of the object detecting means to thereby analyze the information against the object from a signal input from the object detecting means; a function selecting means for enabling the user to set an operational mode of the cleaner on to the microcomputer; a cleaning means for performing the cleaning function according to a control signal output from the microcomputer when the user operates the function selecting means to thereby select the operational mode of the cleaner; a driving means for driving powered wheels disposed on a floor surface of the cleaner when the cleaner is operated according to the information detected from the object detecting means by being connected to the microcomputer; and a cord tension adjusting means for maintaining a constant tension of the electrical cord being extracted from or being pulled into the cable assembly when the cleaner is operated by force of the driving means by being connected to the microcomputer.

In accordance with another object of the present invention, there is provide a vacuum cleaner control method by which the aforesaid objects can be achieved, the method comprising the steps of: (a) selecting a functional mode of the cleaner; (b) responding to the selection of the functional mode to thereby connect a driving motor to the powered wheel mechanically; (c) establishing a reference plane surface based a signal against the object information input from the object detecting means; (d) maintaining at a predetermined interval a distance parted from the referenced plane surface to thereby move the cleaner; (e) detecting the obstacle on a travelling route; and (f) responding to the signal detected from the step (e) to thereby change a travelling direction of the cleaner.

BRIEF DESCRIPTION OF THE DRAWINGS

For a fuller understanding of the nature and objects of the invention, reference should be made to the following detailed description taken in conjunction with the accompanying drawings in which:

FIG. 6A–6C is a control circuit diagram of a vacuum cleaner according to the present invention;

FIGS. 8A and 8B–8C are flow charts for explaining the operating sequence of the cleaner according to the present invention.

DETAILED DESCRIPTION OF A PREFERRED EMBODIMENT OF THE INVENTION

A preferred embodiment of the present invention will be described in detail with reference to the accompanying drawings.

The cleaner according to the present invention is mounted with a built-in cable assembly from which an electric cord is extracted to be inserted into an outlet (not shown) for power supply.

The cleaner moves around the cleaning area by itself to thereby perform the cleaning job automatically and can be operated by a remote controller, and more particularly, can be dragged by the user for a manual operation.

Figure 1:
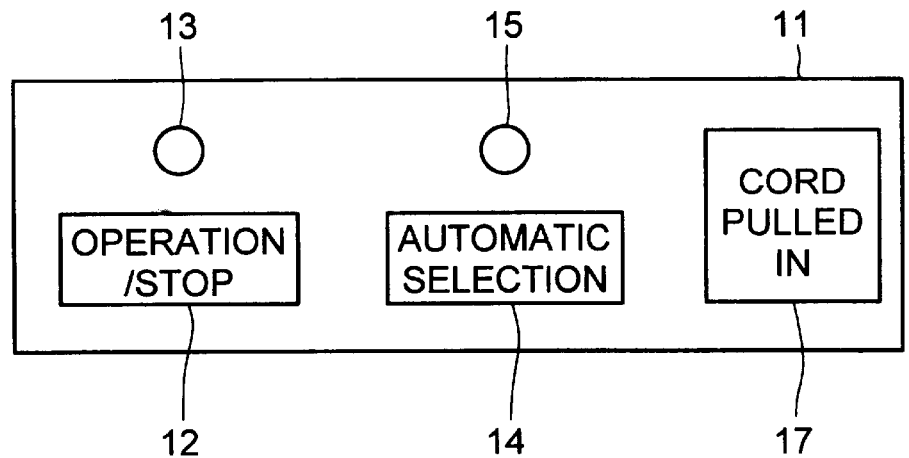
FIG. 1 is a block diagram of the function panel according to the present invention.

FIG. 1 is a block diagram of a function panel 11 attached to the cleaner.

An operation/stop key 12 on the function panel 11 is used for supplying power to or terminating the supply of the power from the cleaner.

In other words, the key is used for initially activating the cleaner.

When the key 12 is pressed to activated the cleaner, a display for displaying the operating state, by way of example, a Light Emitting Diode LED 13 is lit to thereby shown that the power is being supplied.

When the key 12 is pressed once more, the power supply is cut off to thereby turn off the LED 13.

Meanwhile, when the power is initially supplied, the cleaner is operated in an automatic mode.

Accordingly, an LED 15 for displaying an automatic operating mode is simultaneously lit at the press of the operation/stop key 12.

Furthermore, when the key 12 is pressed once more, the power supply is cut off to thereby turn off the LED 15.

Figure 2:
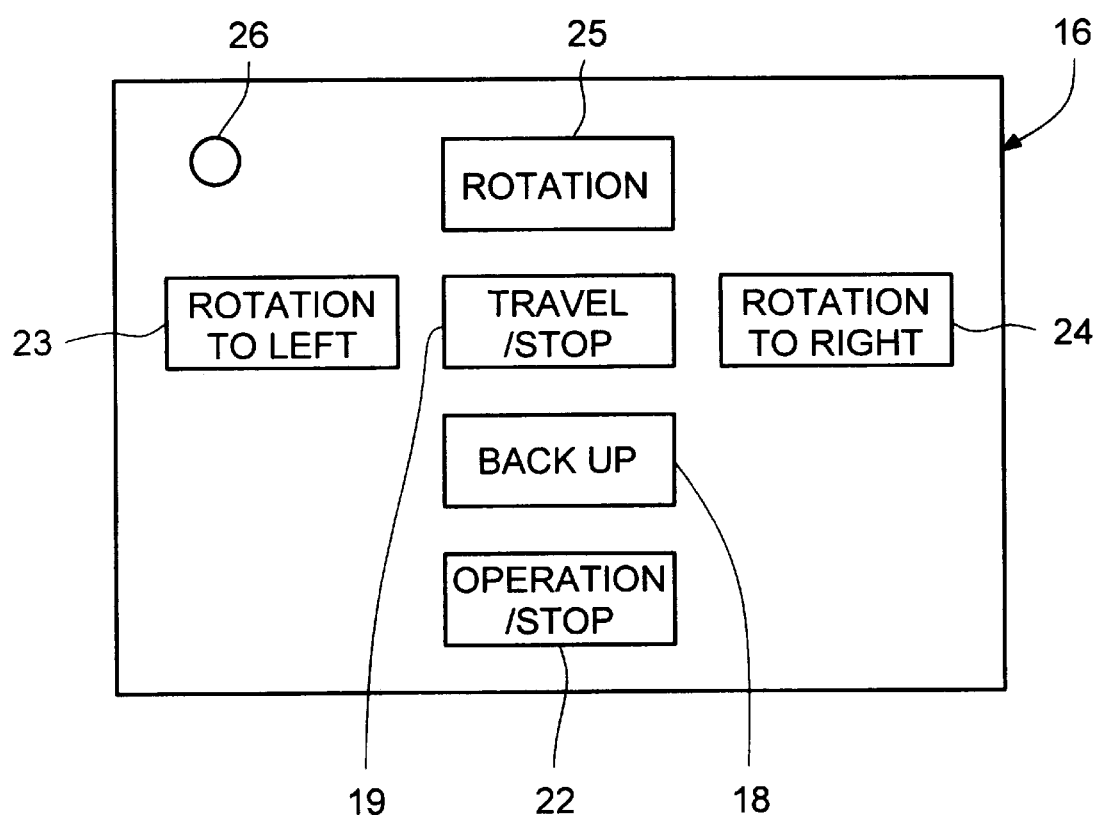
FIG. 2 is a block diagram of a remote controller according to the present invention.

As seen from the foregoing, when the cleaner is operated in an automatic mode under which the cleaner automatically establishes a travelling route to thereby perform the cleaning job, a remote controller 16 as illustrated in FIG. 2 is used for remotely commanding an operation from a predetermined distance.

In other words, the self-propelled cleaner is controlled by a wireless communication from a predetermined distance.

Meanwhile, when the automatic selection key 14 is pressed, the LED 15 is rendered inoperable, which means that an automatic operation mode is released to thereby display a state under which the user can drag the cleaner by himself for manual operation.

Reference numeral 17 is an electrical cord pulling key used for winding up the cord extracted to the outside on a cable assembly disposed within the cleaner, which performs the same function as the one attached to a conventional vacuum cleaner.

A remote controller 16 for remotely commanding an operation will be described with reference to FIG. 2.

In FIG. 1, when the operation/stop key 12 is pressed, the power is supplied and at the same time, a state under which the cleaner is operated in an automatic mode is realized, and accordingly, the cleaner moves in a self-propelled manner to thereby perform the cleaning function.

If the user wishes to be able to alter the path of travel selected by the automatically-operating cleaner, the user presses an operation/stop key disposed on the remote controller 16 illustrated in FIG. 2.

When a travel/stop key 19 is pressed, the cleaner moves forward to travel.

When there is an obstacle in the front of the cleaner during movement of the cleaner, the user detects its presence and presses the travel/stop key 19 once more to stop the movement of the cleaner.

At this time, if the user presses a backward driving key 18, the cleaner is driven backward to thereby displace the same from the obstacle.

Besides stopping or reversing the cleaner when there is an obstacle in the front, the travelling direction can be changed.

In other words, if a left turn (rotation) key 23 is pressed, the cleaner is turned to the left, and if a right turn key 24 is pressed, the cleaner is turned to the right.

Particularly, when the user presses a rotation key 25, the cleaner rotates 180 degrees from a present position and travels to a direction opposite from the prior travelling direction, and whenever the above-mentioned keys are pressed, a LED is turned on.

As mentioned above, the cleaner according to the present invention enables the user to use the remote controller in changing the travelling direction at will while the cleaning job is performed, besides the automatic cleaning job according to its own judgement while travelling.

Furthermore, the cleaner according to the present invention is so constructed as to enable the user to drag along the cleaner for a cleaning job when the mode is changed from automatic to manual, as will be explained in the following.

Next, a mechanical structure of the cleaner will be described in detail with reference to FIG. 3 for illustrating a transverse cross sectional view of the cleaner and FIG. 4 for illustrating a longitudinal cross sectional view according to the present invention.

Figure 3:
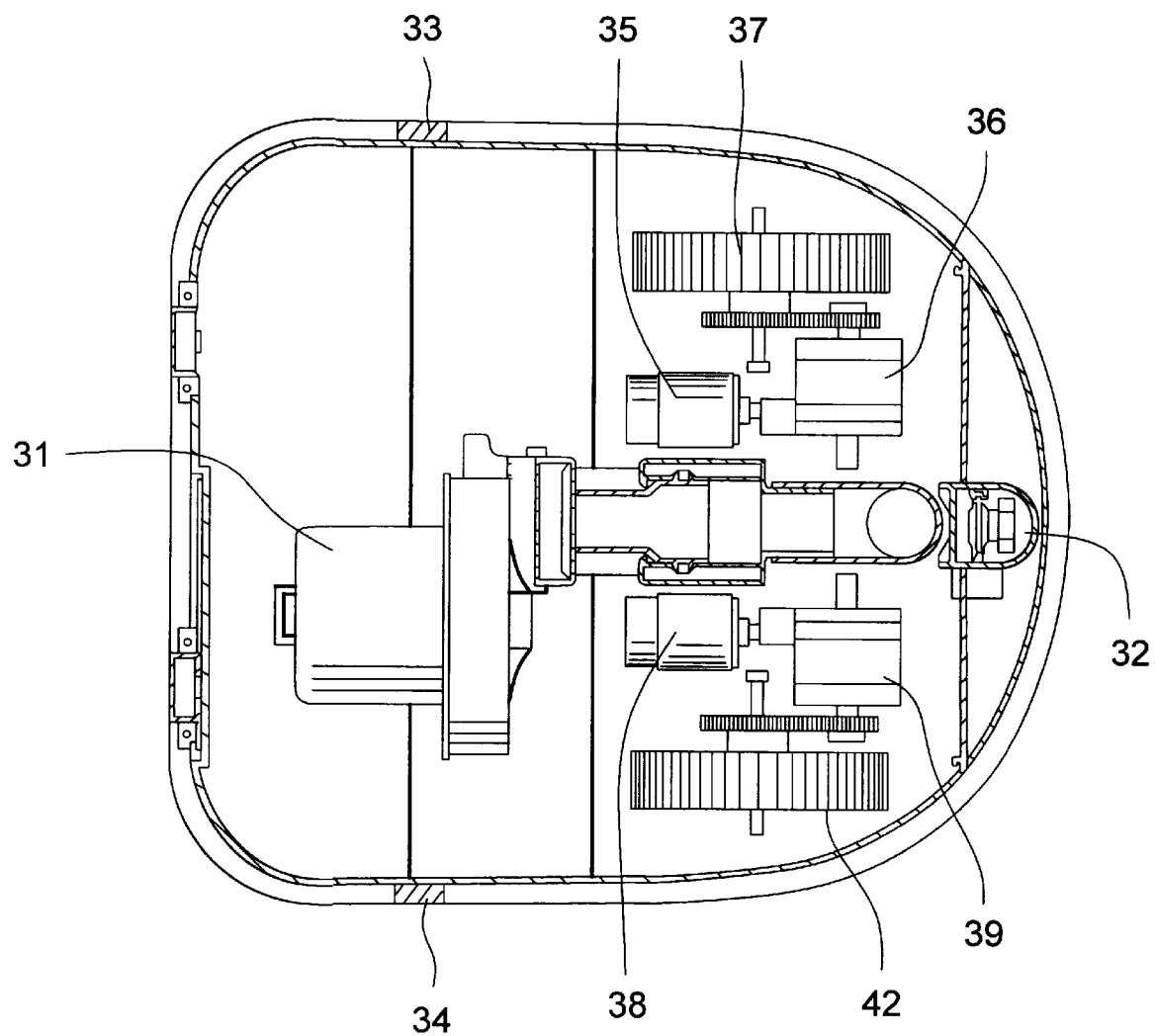
FIG. 3 is a transverse sectional view of a vacuum cleaner according to the present invention.

Reference numeral 31 in FIG. 3 designates a cleaning motor of a suction generator for generating suction force for sucking in dust and is utilized in performing the cleaning job.

The cleaner illustrated in FIG. 3 is provided with object detecting means 32, 33 and 34 for enabling the cleaner to evade an object in front of the cleaner and to proceed forward.

In other words, the cleaner is disposed at its end area with a navigation sensor 32 which is a kind of ultrasonic sensor for detecting objects in the front of the cleaner. The cleaner is provided at its left and right side in predetermined positions with ultrasonic sensors 33 and 34 for detecting a distance to a wall surface in the cleaning area.

The navigation sensor 32 rotates 180 degrees around the front according to a turning effect supplied from a driving unit such as the motor and the like, to thereby detect an object lying within a rotational range thereof, and the ultrasonic wave sensors 33 and 34 detect objects within a normal line, to be explained in more detail, e.g., detect wall surfaces within the cleaning area.

The cleaner is provided on its floor with one pair (left and right) of driving means for generating a travelling force of the cleaner.

The left driving means includes a motor 35 for generating a driving force, and the motor 35 is mechanically connected to a powered wheel 37 via an electronic clutch 36.

The electronic clutch 36 is used for discontinuing the driving force of the powered wheel 37 supplied from the motor 35 to the powered wheel 37.

In other words, when the cleaner is operated In the automatic mode, the electronic clutch 36 connects the motor 35 to the powered wheel 37 mechanically, and when the cleaner is switched to the manual mode, the electronic clutch 36 mechanically separates the wheel from the motor.

The driving means disposed on the right has the same structure as the driving means disposed on the left.

In other words a motor 38 for generating the power is connected to a powered wheel 42 through an electronic clutch 39, which can selectively interrupt the driving force supplied from the motor 38 to the powered wheel 42.

Figure 4:
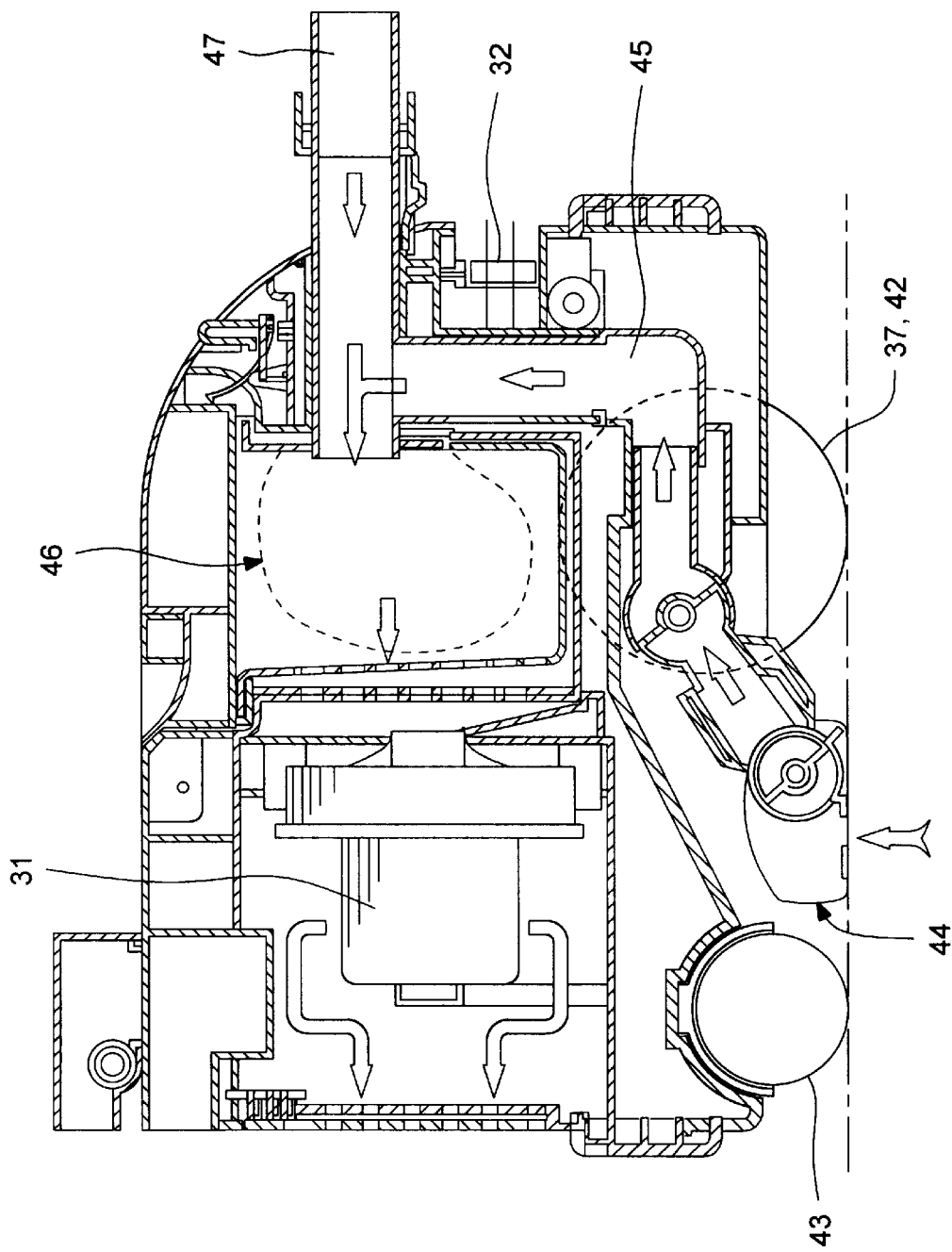
FIG. 4 is a longitudinal sectional view of the cleaner according to the present invention.

FIG. 4 is a longitudinal sectional view of the cleaner, and like reference numerals are used for designation of like or equivalent parts or portions for simplicity of illustration and explanation.

In FIG. 4, the cleaner is provided at one end with the navigation sensor 32 for detecting obstacles in the front thereof, and in its center, provided with the cleaning motor 31 and on its floor surface provided with the pair of powered wheels 37 and 42.

The cleaner is provided, on its rear floor surface, with a powerless wheel 43 which is not connected to a power source such as the motor and the like, and the powerless wheel 43 supports a rear end load of the cleaner.

Furthermore, the powerless wheel 43 enables the cleaner to change the travelling route easily, which necessitates that the powerless wheel 43 have a 360 degree rotation.

A brush 44 is disposed between the powered wheels 37 and 42 and the powerless wheel 43 for collecting dust, and the dust collected through the brush 44 is fed to a dust collecting bin 46 disposed within the cleaner through a conduit 45.

Meanwhile, a nozzle 47 is illustrated in FIG. 4 which is used for operating of the cleaner changed from the automatic mode to the manual mode.

In other words, in the case of the manual mode under which the user performs the cleaning job by dragging along the cleaner, a lid (not shown) disposed at an end of the cleaner is removed, and the nozzle 47 is insertedly mounted to the end of the cleaner as illustrated in FIG. 4.

The nozzle 47 is mounted only when the cleaner is operated in a manual mode.

Accordingly, when the cleaner is operated in the automatic mode, the nozzle 47 should be removed from the cleaner, which therefore unblocks the passage 45 so that the dust can be collected through the brush 44 as mentioned above.

At this time, the lid (not shown) is replaced onto the end of the cleaner and causes a hole in which the nozzle is inserted to be closed.

FIG. 4 has illustrated particular dust collecting routes for the manual and automatic modes in order to help explain the present invention but it should be apparent that other dust collecting routes can be formed.

Next, FIG. 5 will be described which depicts the tension adjustment unit for the electric cord.

The cleaner according to the present invention, unlike the conventional cordless cleaner, is supplied with power through the electric cord, and in order for the cleaner to perform the cleaning job smoothly on its self-propelled manner, the cleaner should be given a free wheeling capability to travel freely regardless of its structure as in the cordless cleaner.

In order to accomplish the free wheeling capability of the cleaner, the present invention is structured to have an electric cord tension adjustment unit for adjusting the tension of the electric cord 51 at a predetermined force at all times to such a degree that the cleaner is not hindered in its movement.

Figure 5:
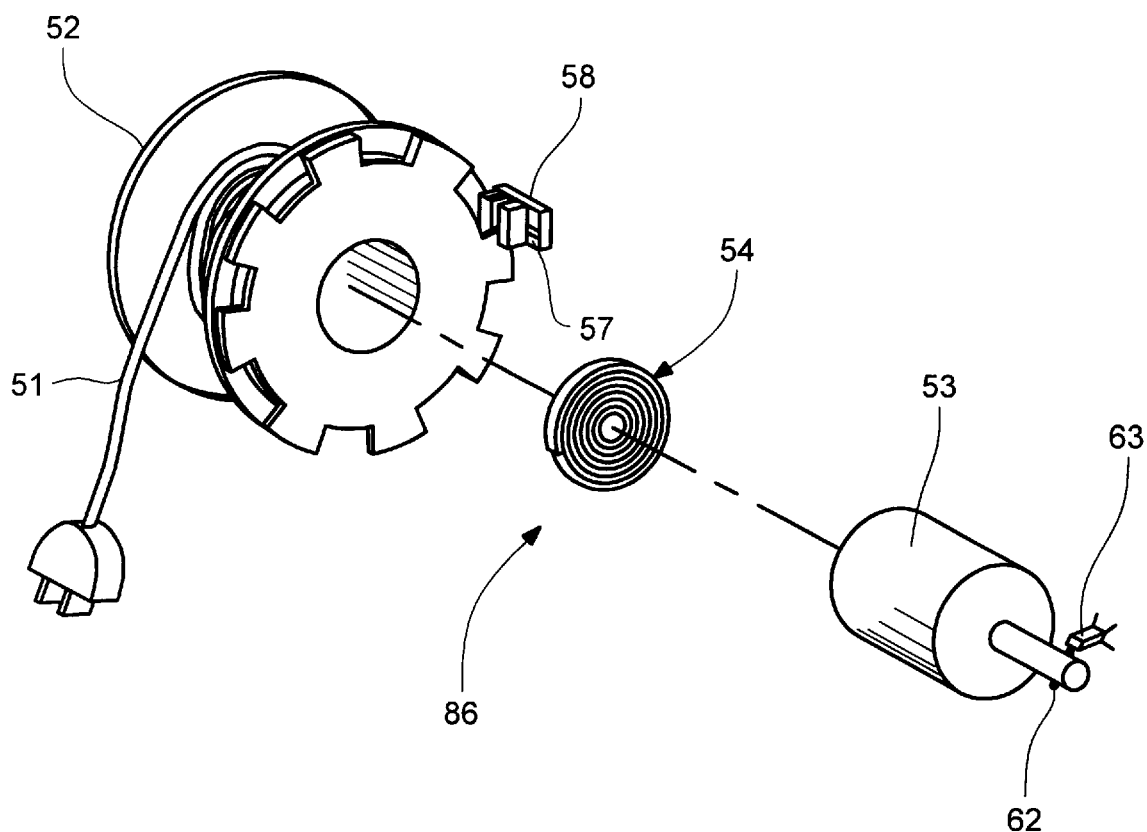
FIG. 5 is a perspective exploded view of an electrical cord tension adjustment unit according to the present invention.

In FIG. 5, the electric cord 51 is wound up on a cable reel assembly 52, on a central area of which there is disposed a motor 53 for supplying a turning effect during cord extraction and retraction. A spiral plate spring 54 is mechanically connected between the motor 53 and the assembly 52, wherein one end of the spring 54 is fixed to the assembly 52 and the other end of the spring 54 is fixed to an axle of the motor 53.

When the electrical cord 51 is extracted, the assembly 52 is forced into counterclockwise rotation which tends to wind-up the plate spring 54 in the counterclockwise direction. Conversely, when the plate spring is allowed to unwind, it forces the assembly 52 into clockwise rotation to retract (pull-in) the cord. It will be appreciated that if the inner (central) end of the plate spring were held stationary, the spring force (and thus cord tension) would progressively increase as the cord is extracted, and the spring force (and thus cord tension) would progressively decrease as the cord is retracted.

Figure 6A:
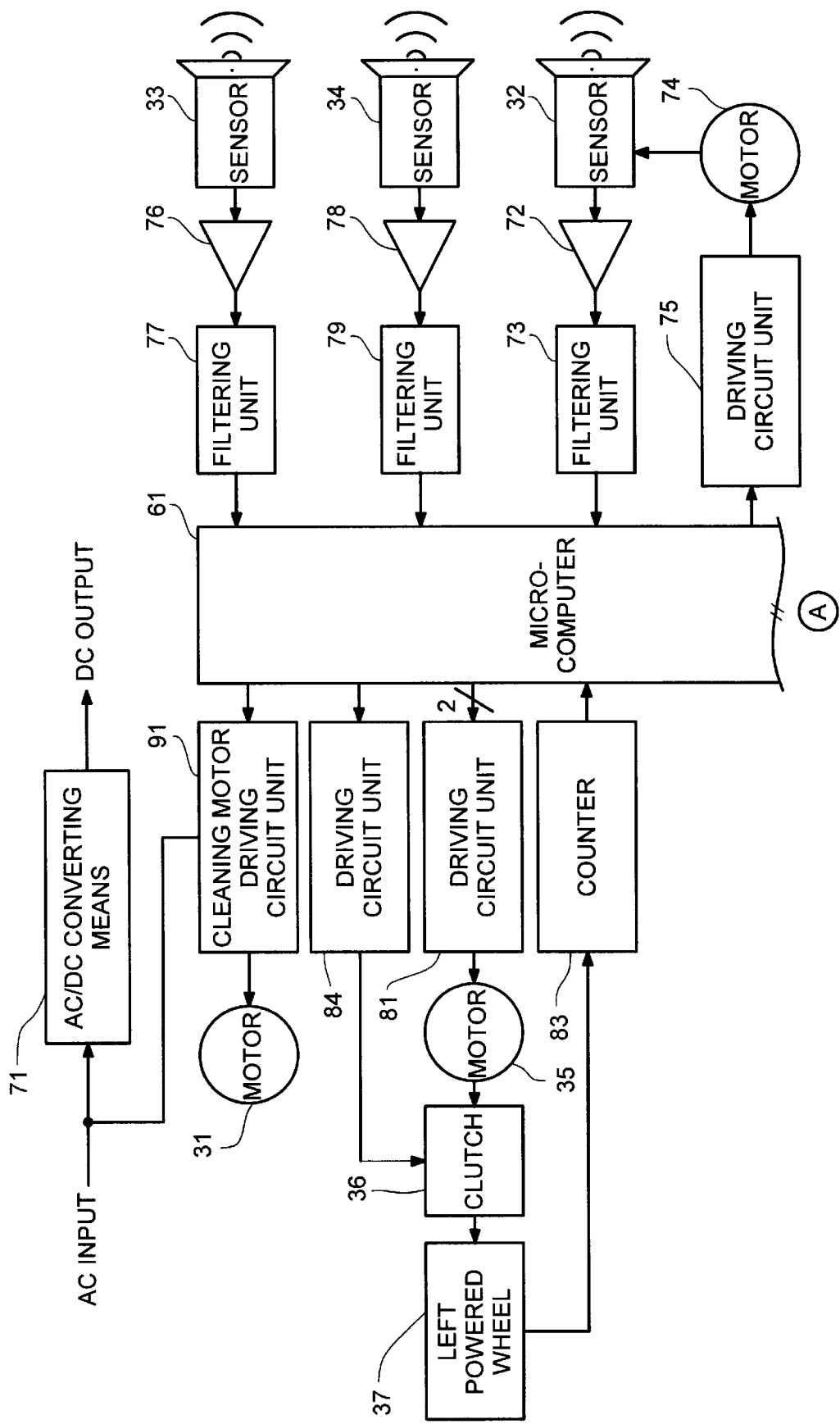

In accordance with the present invention, however, the microcomputer 61 illustrated in FIG. 6A–6C drives the motor 53 (and this drives the inner end of the plate spring) in the same direction as the assembly 52 is rotated. As a result, as the cord is extracted, the assembly 52 winds-up the outer portion of the plate spring 54, but the motor 53 simultaneously unwinds the inner portion of the plate spring, thereby maintaining a constant spring tension (and a constant cord tension). Also, during the cord-retraction operation, the outer portion of the plate spring unwinds but the motor 53 simultaneously winds-up the inner portion of the plate spring to maintain a constant spring tension (and a constant cord tension).

These kinds of operations are realized by way of a sensor.

In other words, the assembly 52 is, in its side, disposed with a rotating plate 56 rotating therewith, and a periphery of the rotating plate 56 is formed with a plurality of sawtoothed shutters 55. The rotating plate 56 is disposed adjacent to first and second rotational direction detecting sensors, for example, photocouplers 57 and 58 each comprising a light emitting unit for supplying a light beam and a light receiving unit for receiving the light therefrom.

The light supplied from the light emitting unit to the light receiving unit is cut off wherever a shutter 55 formed at the periphery of the rotating plate 56 passes between the light emitting unit and the light receiving unit.

The microcomputer 61 detects the rotating direction of the cable assembly 52 in accordance with the order in which the light beams of the first and second sensor 57 and 58 is cut off.

By way of example, the microcomputer 61 determines that the cable assembly 52 is rotated counterclockwise and the electric cord is extracted when the light beam of the first sensor 57 is cut off before the light beam of the second sensor 58.

Conversely, the microcomputer 61 determines that the cable assembly 52 is rotated clockwise and the electric cord is pulled in (retracted) when the light beam of the second sensor 58 is cut off before the light beam of the first sensor 57.

The sensor 57 and 58 are also used for measuring the number of revolutions of the cable assembly 52.

In other words, whenever a shutter 55 cuts off the light, a rectangular wave is output from the sensor 57 and 58, and the microcomputer 61 counts the frequency of the rectangular wave which is being output to thereby determine the number of revolutions of the cable assembly 52.

At this time, the microcomputer 61 drives the motor for the same number of revolutions the cable assembly 52 as the latter functions to wind up or unwind the plate spring 54.

The number of revolutions of the motor 53 is measured by a sensor. In other words, the motor rotating shaft has a sensing means for detecting the number of revolutions of the motor shaft, by way of example, a Hall sensor comprised of a magnetic piece 62 and a Hall element 63, and the Hall element 63 is connected to the microcomputer 61.

Accordingly, the microcomputer combines signals respectively coming from the first and second sensor 57 and 58 and the Hall sensor to thereby control the motor 53.

In other words, the microcomputer determines the rotating direction of the cable assembly 52 and the number of revolutions thereof from the signals supplied from the sensor 57 and 58 and the Hall sensor.

At this time, when the cable assembly 52 is rotated in a counterclockwise direction as the electric cord 51 is extracted, the microcomputer 61 rotates the motor 53 counterclockwise for as many revolutions as the cable assembly 52 to thereby unwind the plate spring 54, and at this point, the number of revolutions of the motor shaft is determined by the direct current waveform supplied from the Hall element 63.

Conversely, when the cable assembly 52 is rotated in a clockwise direction as the electric cord is retracted, the microcomputer 61 determines this by way of the output from the sensor 57 and 58, and then the microcomputer 61 rotates the motor 53 for as many revolutions as the cable assembly 52 to thereby wind up the plate spring 54, so that the tension of the electric cord 51 is maintained at a predetermined force.

Next, a control circuit of the cleaner thus explained will be described with reference to FIG. 6.

In FIG. 6, an AC/DC converting means 71 converts an AC phase power to DC phase power to thereafter supply the power necessary to respective component means to be explained later.

The cleaner according to the present invention uses the microcomputer 61 as a main control source and drives a cleaning motor 31 connected to a cleaning motor driving circuit unit 91 to thereby perform the cleaning job.

The function panel 11 illustrated in FIG. 1 is connected to an input terminal of the microcomputer 61 while a display unit 21 comprised of LED'S 13 and 15 is connected to an output terminal of the microcomputer 61.

Furthermore, the input terminal of the microcomputer 61 is connected through a buffer 93 to a receiving circuit unit 92 for receiving a signal transmitted from the remote controller 16 illustrated in FIG. 1.

The microcomputer 61 with this structure controls the function of the cleaner according to a command directed through the remote controller 16 by the user.

Meanwhile, in order for the cleaner to be operated under the automatic mode, the microcomputer 61 determines ambient conditions, e.g., obstacles according to the signal input from an object detecting means comprising ultrasonic wave sensors 33 and 34, and according to the determination, controls various driving sources.

In other words, the cleaner carries at one of its ends a navigation sensor 32 for detecting obstacles within a forwarding direction of 180 degrees while the cleaner is travelling forward.

The navigation sensor 32 is connected to the input terminal of the microcomputer 61 through an amplifier 72 for amplifying a meager signal reflected from the navigation sensor 32 and through a filtering unit 73 for removing noise components and the like of high frequency included in the signal.

Meanwhile, the navigation sensor 32 is mechanically connected to a driving means for providing a turning effect, by way of example, to a stepping motor 74, and the sensor 32 receives the driving force from the stepping motor 74 to conduct a 180-degree oscillating rotational motion.

The stepping motor 74 is connected to the output terminal of the microcomputer 61 through a driving circuit unit 75.

In other words, the navigation sensor 32 is operated by control of the microcomputer 61.

Besides the navigation sensor 32 for being operated in a rotational manner as an object detecting means, the cleaner is provided with the ultrasonic wave sensors 33 and 34 of fixed types on left and right sides of a body respectively.

The ultrasonic wave sensor 33 disposed on the left side transmits ultrasonic waves toward an object disposed at the left side when seen from the forwarding direction of the cleaner e.g., toward a wall surface disposed to the left of the cleaning area, and analyzes reflective waves to thereby determine a distance to the object.

The ultrasonic wave sensor 33 is connected to the input terminal of the microcomputer 61 through an amplifier 76 for amplifying a meager signal reflectively coming from the left side wall surface and a filtering unit 77 for removing noise components and the like of high frequency included in the signal.

The ultrasonic wave sensor 34 disposed fixedly on the right side of the cleaner, just like the above mentioned ultrasonic wave sensor 33, detects a reflective wave from the right side wall surface to thereby output the same to the microcomputer 61, so that the microcomputer 61 can determine a distance to the right side wall surface.

The ultrasonic wave sensor 34 is also connected to the input terminal of the microcomputer 61 through an amplifier 78 for amplifying the meager signal received from the right side wall surface and through a filtering unit 79 for removing noise components and the like of high frequency included in the signal.

As seen from the foregoing, the microcomputer 61 which has received the signal for representing the distance to the wall surface from the ultrasonic wave sensors 33 and 34 establishes either the left side or right side wall surface as a reference surface (reference plane) to thereby control the forward direction of the cleaner.

Figure 7:
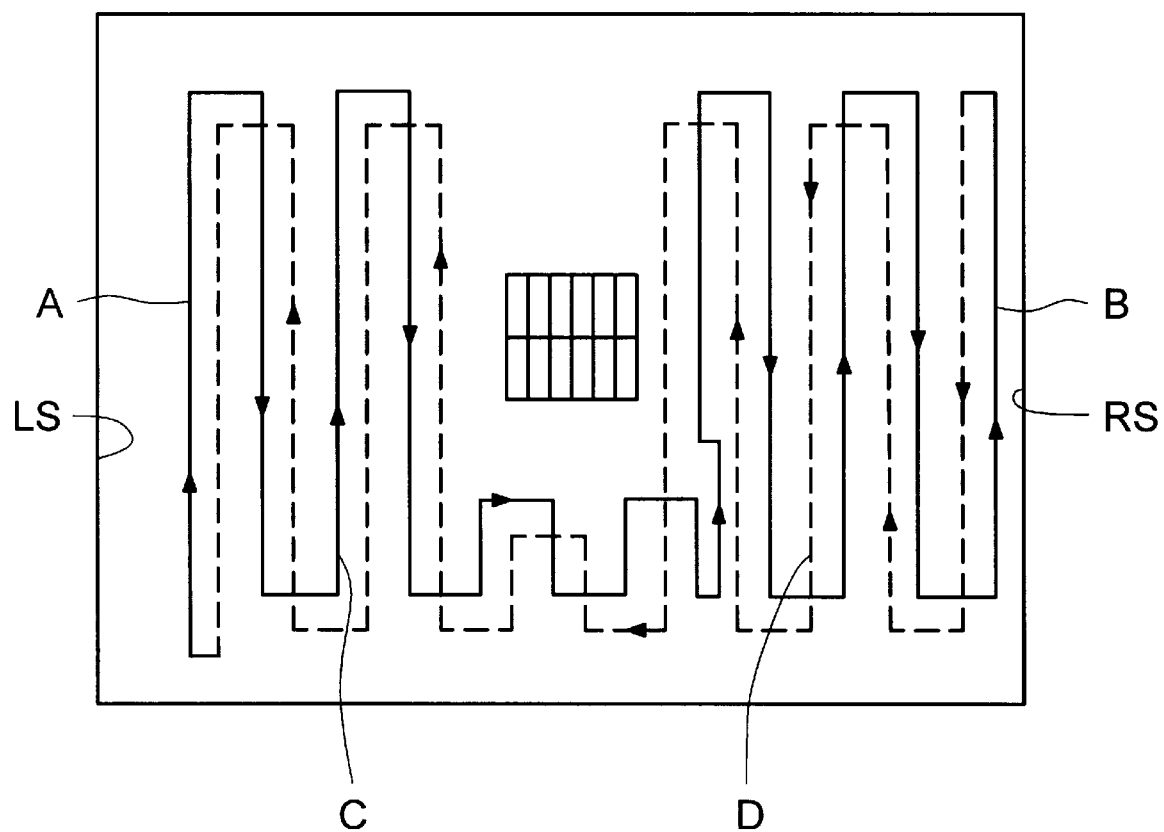
FIG. 7 is a schematic drawing for illustrating a travelling route of the vacuum cleaner according to the present invention.

In other words, as illustrated in FIG. 7, when it is assumed that the cleaner travels along a route A at the initial stage, the ultrasonic wave sensors 33 and 34 disposed both on left and right sides output a signal for representing the distance to the left and right side wall surfaces LS, RS from the microcomputer 61.

Because the distance to the left side wall surface LS is nearer than that of the right side wall surface RS if seen from the route A, the microcomputer 61 establishes he left side wall surface as the reference wall surface.

Once the reference wall surface is established, the microcomputer 61 does not change the pre-established reference surface until the cleaner approaches an opposite wall surface thereof, in other words, the right side wall surface at a predetermined distance.

In other words, it is not until the cleaner travels along a route B which is the nearest to the right side wall surface that the microcomputer 61 establishes the right wall surface as the reference surface to thereafter run the cleaner again toward the left side wall surface.

In the above description, explanation has centered around a case where the cleaner starts from the route A which is the nearest to the left side wall surface, however, in case the cleaner starts from a route C illustrated in a continuous line, because the cleaner disposed on the route C is located nearer to the left side wall surface than to the right side wall surface, the microcomputer 61 establishes the left side wall surface as the reference surface to thereby cause the cleaner to travel toward the right side wall surface for performance of the cleaning job.

Meanwhile, in case the cleaner starts from a route D illustrated in a dotted line which is nearer to the right side wall surface than the left side wall surface, the microcomputer 61 establishes the right side wall surface as the reference surface to thereby control the cleaner for travel toward the left side wall surface.

As seen from the above, the reference surface can be easily established if the left side wall surface or right side wall surface is detected. However, when it becomes difficult to establish the reference surface due to the presence of obstacles such as a chair, sofa or the like, the microcomputer 61 moves the cleaner to a predetermined distance area to thereafter seek the reference surface again.

As seen from the foregoing, in order to analyze the signal supplied from the object detecting means and to control various means, because a memory unit (not shown) internally disposed in the microcomputer 61 is limited in its capacity of memory, an auxiliary memory means 97, by way of example, a dynamic RAM, DRAM 97 for expanding the capacity of the memory can be connected to input/output ports of the microcomputer 61 through a buffer 94.

Next, a driving system of the cleaner will be described.

The cleaner, as illustrated in FIG. 4, travels by way of the drive of the left and right side powered wheels 37 and 42 disposed on the floor thereof.

The left side powered wheel 37 receives power from a driving motor 35 which is in turn connected to the output terminal of the microcomputer 61 through a motor driving circuit unit 81.

The motor 35 can rotate in the right or reverse direction, and in order to control the motor form the right or reverse rotation, two control lines extend from the motor driving circuit unit 81 and are connected to output terminals of the microcomputer 61.

A motor 38 and a motor driving circuit unit 82 connected to the right powered wheel 42 are connected to the microcomputer 61 in a like manner.

In other words, the right side powered wheel 42 is mechanically connected to a driving motor 38 which is in turn connected to the output terminals of the microcomputer 61 through a driving circuit unit 82 having two control lines.

A signal of high or low level is selectively output from the two output terminals.

In other words, when the microcomputer outputs the signal of high level to both driving circuit units 81 and 82 through a first output terminal, the motors 35 and 38 are rotated in the normal direction, and the pair of powered wheels 37 and 42 are rotated in the same normal direction to thereby cause the cleaner to travel forward.

Meanwhile, when the microcomputer 61 outputs a signal of high level to the driving circuit units 81 and 82 through the second output terminal, the motors 35 and 38 and the pair of powered wheels 37 and 42 are rotated reversely to thereby back up the cleaner.

When the travelling direction of the cleaner is to be changed or rotated 180 degrees from a present position, the microcomputer 61 selects one of the driving circuit units 81 and 82 to thereby output the signal of high level through a first control line.

In other words, when the signal of high level is output only to the driving circuit unit through the first control line, the cleaner is rotated to the left because only the left side powered wheel 37 is driven while the right side powered wheel 42 is stationary, and when the signal of high level is output only at the first control line of the driving circuit unit 82, the cleaner is rotated to the left but if a signal supply period is extended, the cleaner is rotated as far as 180 degrees.

The left side powered wheel 37 is provided, on its rotational shaft, with a counter 83, for counting revolutions of the wheel, and an output terminal of the counter 83 is connected to the input terminal of the microcomputer 61.

A counter 89 connected to the right side powered wheel 42 has the identical structure thereof.

The microcomputer 61 determines the revolutions of the left and right side powered wheels from a signal input from the counters 83 and 89, and at this time, the microcomputer 61 controls the left and right side motor driving circuit units 81 and 82 in order to cause the left and right side powered wheels to have the same rotating speeds, and at the same time determines whether or not the cleaner is now travelling.

In other words, if the revolution data of the wheels are not input from the counters 83 and 89 because of the cleaner being caught by an obstacle, even though the control signal has been output from the motor driving circuit units 81 and 82, the microcomputer 61 determines the situation thereof to thereby drive a speaker 96 through a driving circuit unit 95, and upon hearing an alarm sound generated from the speaker 96, the user frees the cleaner.

Meanwhile, besides the function that the cleaner according to the present invention can perform the cleaning job by itself while travelling around the cleaning area, the cleaner is made to perform the cleaning job by way of the user's manual operation, depending on the circumstances.

As mentioned above, clutches 36 and 39 for mechanically connecting or separating the driving motors 35 and 38 relative to the left and right side powered wheels 37 and 42 are disposed therebetween in order to operate the cleaner manually, as illustrated in FIG. 4.

Particularly, the clutches 36 and 39 are electronically operated and controlled by the microcomputer 61 connected to input terminals of clutch driving circuit units 84 and 85.

In other words, when the microcomputer receives a command for manual operation by way of the automatic selection key 14 illustrated in FIG. 1 being released, the microcomputer 61 outputs a control signal according to the command of the user to the clutch driving circuit units 84 and 85, which in turn drives the clutches 36 and 39 in order for a power transmitting system between the wheels 37 and 42 and the motors 35 and 38 to be separated.

The powered wheels 37 and 42 are now as good as the powerless wheels in a state under which the power transmission system between the powered wheels 37 and 42 and the driving motors can perform the cleaning job dragging along the cleaner.

One of the characteristics according to the present invention is that the cleaner can conduct the cleaning job freely without recourse to the electric cord while travelling around the cleaning area.

In other words, a cord assembly 86 comprising the cable assembly 52 on which the electric cord is wound, a rotating plate 56 attached to one side of the cable assembly 52 and the plate spring 54 as illustrated in FIG. 5 is mechanically connected to the driving motor 53.

The driving motor 53 is connected to the microcomputer 61 through the motor driving circuit unit 87.

The motor 53 is capable of rotating in the normal and reverse directions, and two control lines are extracted from the driving circuit unit 87 in order to control the motor to rotate in the normal and reverse directions. The two control lines are connected to two output terminals on the microcomputer 61.

A control signal of high level or low level is selectively output from the output terminals.

In other words, when a control signal of high level is output from the first output terminal, the motor 53 is rotated in the normal direction to thereby wind up the plate spring 54 attached to the cord assembly 86, and when a control signal of high level is output from the second output terminal, the motor is rotated in the reverse direction to thereby unwind the plate spring 54.

Meanwhile, the first and second direction detecting sensors 57 and 58 for detecting rotational directions of the cable assembly 52 whenever the electric cord 51 is pulled in or extracted are disposed near the cable assembly 52 comprising the cord assembly 86, by way of example, photocouplers are disposed near the cable assembly 52, and the sensors 57 and 58 are connected to the input terminal of the microcomputer 61 respectively.

Accordingly, the microcomputer 61 determines the rotational direction of the cable assembly 52 according to time difference in cut-off of the light coming out of the sensors 57 and 58 by way of the shutters 55 of the rotating plate 56 illustrated in FIG. 5.

By way of example, when the light of the second sensor 58 is cut off after the light of the first sensor 57 is cut off, the microcomputer 61 determines that the cable assembly 52 is being rotated counterclockwise i.e., the electric cord 51 is extracted.

In this process, the elasticity of the plate spring 54 would ordinarily tend to be increased to thereby increase the tension of the electric cord 51, but in accordance with this invention, the microcomputer 61 supplies a control signal to the motor driving circuit unit 87 in order to rotate the motor 53 counterclockwise to maintain the cord tension constant.

Meanwhile, when the electric cord 51 is pulled into the cable assembly 52, the assembly 52 is rotated clockwise. At this time, the light of second sensor 58 is cut off before the light of the first sensor 57, and the microcomputer 61 determines a rotating direction of the cable assembly 52 according to the signal input from the sensors 57 and 58.

When the cable assembly 52 is rotated clockwise as mentioned above, the elasticity of the plate spring 54 would ordinarily tend to be decreased to thereby decrease the tension of the electric cord 51, which causes the microcomputer 61 to supply the control signal to the motor driving circuit unit 87 in order to rotate the motor 53 clockwise.

Meanwhile, the direction detecting sensors 57 and 58 determine the rotating directions of the cord assembly 87 and at the same time determine the revolution thereof to thereby control the spring motor 53.

In order to accomplish the aforesaid process, a revolution detecting sensor 88, by way of example a Hall sensor comprising a Hall element and the like, is connected to a shaft of the motor 53, and the detecting sensor 88 is in turn connected to the input terminal of the microcomputer 61.

Accordingly, the microcomputer 61 determines the rotating directions of the cable assembly 52 and the revolutions thereof according to the direction detecting sensors 57 and 58, and determines a shaft revolution of the motor 53 according to the revolution detecting sensor 88.

Then, the microcomputer 61 is caused to control the motor driving circuit unit 87 in order for the motor 53 to rotate in a direction in which the cable assembly 52 is rotated.

At this time, because the shaft revolutions of the motor 53 are determined by the revolution detecting sensor 88, the microcomputer 61 is now caused to control the driving circuit unit 83, so that the motor 53 can be rotated by as many revolutions as the assembly 52.

Figure 8A:
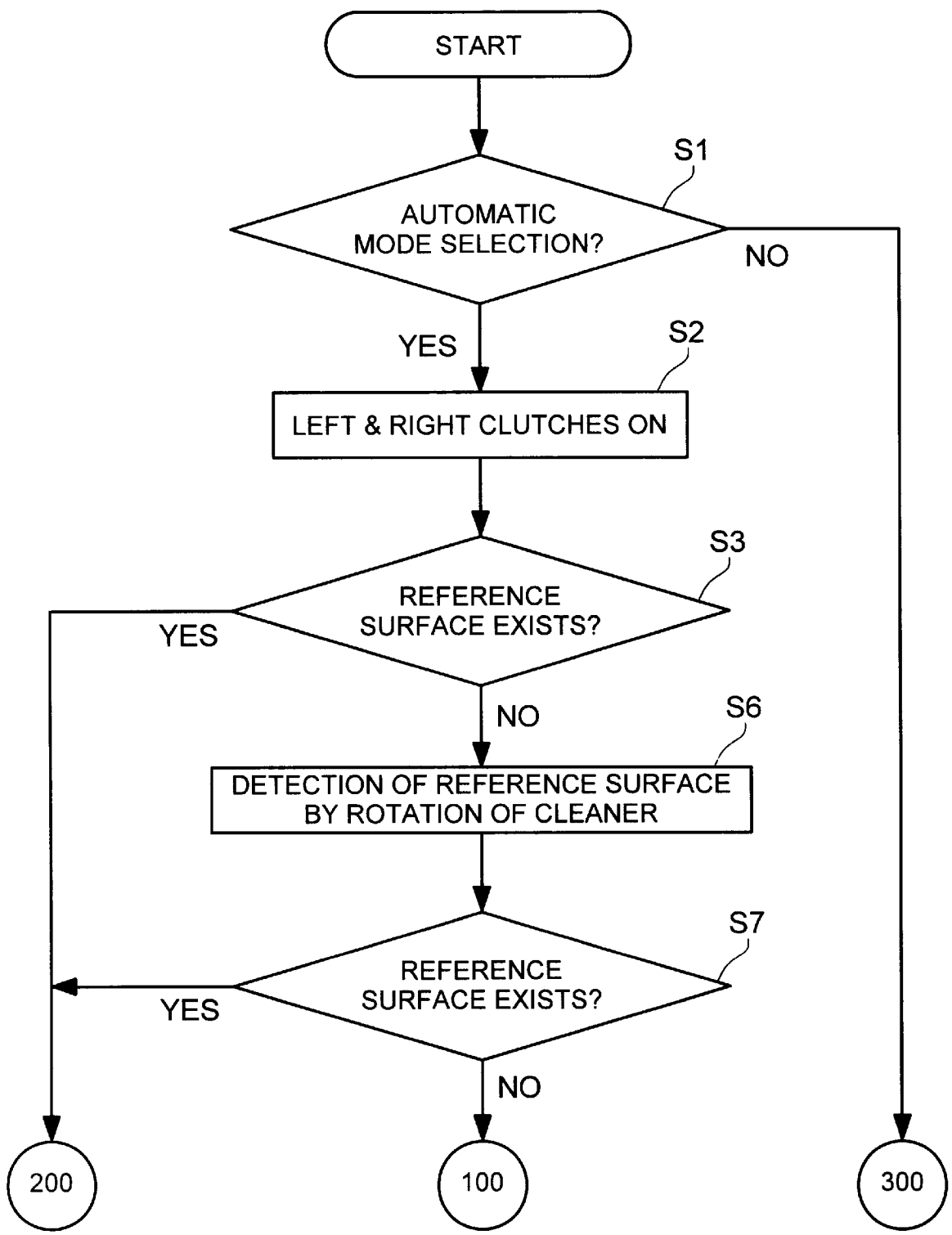
Figure 8C:
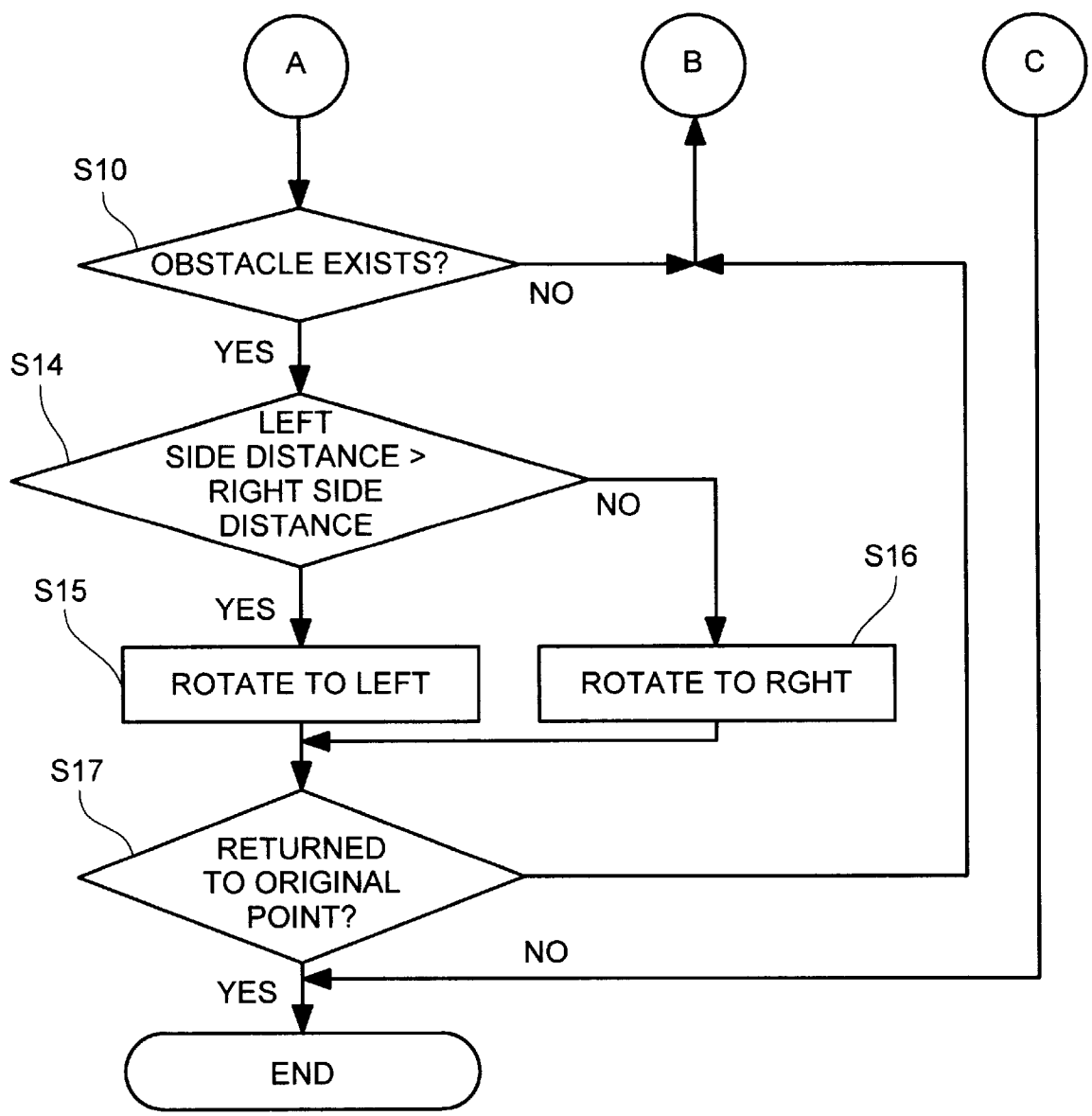

Next, a control method of the cleaner according to the present invention will be described with reference to flow charts illustrated in FIGS. 8A–8C.

The cleaner starts operation when the user connects the electric cord extracted from the cleaner to an outlet and presses the operation key 12.

The microcomputer 61 determines that an automatic mode has been selected (step S1).

At this time, the user could select the manual mode by pressing the automatic selection key 14, whereupon the automatic mode of the cleaner would be stopped. Otherwise, the microcomputer 61 drives the clutch driving circuit units 84 and 85, step S2, to thereby render the left and right clutches 36 and 39 activated (step S2).

In other words, the driving motors 35 and 38 and left and right powered wheels 37 and 42 are mechanically connected.

The microcomputer 61, then, analyzes the signals input from the ultrasonic wave sensors 33 and 34 disposed on the left and right side surfaces of the cleaner to thereby determine whether there is a standard surface which can be a reference for the forwarding direction, step S3.

At this time, if the wall surface in the cleaning area is immediately detected from a position where the cleaner is situated, step S4, to thereby effectively establish a reference surface, flow proceeds to step S5, to thereby operate the driving means comprising the driving motors 35 and 38, so that the cleaner can travel with the established standard surface as a reference.

However, if the cleaner is surrounded by obstacles at the step S3, there is no easy way to establish the reference surface, the microcomputer 61 counts for a predetermined period of time, and thereafter proceeds to step S6, and drives selectively one of the motors 35 and 38 connected to the left or right side powered wheel 37 or 42 for rotation of the cleaner.

In other words, if the microcomputer 61 outputs a control signal of high level from the first output terminal out of the two output terminals connected to the driving means comprising the left side powered wheel 35, the left side driving motor 35 is rotated in the normal direction to thereby cause the left side powered wheel 37 connected to the motor 35 to rotate clockwise, which is the normal direction.

At this time, the cleaner is rotated to the right.

Conversely, if the microcomputer 61 outputs a control signal of high level from the second output terminal connected to the driving means comprising the right side powered wheel 42, the right side powered wheel 42 is rotated clockwise by the driving of the motor 38 to thereby rotate the cleaner to the left.

As described above, the microcomputer 61 analyzes the signals input from the left and right side ultrasonic wave sensors 33 and 34 during the rotation of the cleaner, thereby detecting the standard reference surface.

After the elapse of a predetermined period of time, the microcomputer 61 determines again whether there is a standard surface, step S7.

If it is determined that there is a standard surface, flow advances to the step S4, to thereby drive the driving means with the established standard surface as a reference, but if it is determined that there is no standard surface, flow proceeds to step S8, to thereby abandon establishment of the standard surface.

Flow then proceeds to step S9, thereby driving the driving means to run the cleaner without reference to the standard surface.

Flow now advances to step S10 to determine whether there is an obstacle in the front according to the signal input from the navigation sensor 32.

Meanwhile, if it is determined at the step S4 that there is a standard surface, the microcomputer confirms that the standard surface is the effective one and drives the left and right side powered wheels 37 and 42 at step S5 to thereby move the cleaner forward.

The microcomputer 61 now determines at step S11, whether detected signals are continuously received from the ultrasonic wave sensors 33 and 34 to thereby maintain a constant distance from the standard surface and repeatedly performs step S12 for selectively driving the left or right powered wheel and adjusts the travelling direction of the cleaner whenever the need occurs.

The microcomputer 61 determines whether the cleaner maintains a distance from the standard surface, and at the same time, proceeding to step S10, receives the detected signal against the object from the navigation sensor 32 to thereby determine whether there is any obstacle on the forward route.

At this time, if no obstacle is detected, flow proceeds to step S13, to thereby determine whether the existing standard surface is effective according to the signal supplied from the ultrasonic wave sensors 33 and 34.

If the existing standard surface is determined as effective, flow advances to step S5, and if the standard surface has not been established before, or if the standard surface is to be changed to thereby be nearer to an opposite wall surface, flow proceeds to step S9, to thereby repeat the steps subsequent to step S9.

Meanwhile, if it is determined at step S10 that there is an obstacle in the front, flow proceeds to step S14, to thereby determine which side, i.e., the left or right side, is nearer to the obstacle based on the front as a reference.

As a result of the determination, if the right side is closer to the obstacle, the microcomputer 61 drives the right side powered wheel 38 clockwise, step S15, to thereby cause the cleaner to rotate to the left.

If the left side is nearer to the obstacle, the microcomputer drives the left side powered wheel 35, step S16, to thereby cause the cleaner to rotate to the right.

As mentioned above, the cleaner changes directions to thereby perform the cleaning job and the microcomputer 61 determines at step S17, whether the cleaner has returned to a starting point.

As a result of that determination, if the cleaning job has been completed, the microcomputer 61 finishes the cleaning function, and if the job has not been completed, flow returns to the step 13, to thereby repeatedly perform the abovementioned processes until the cleaning function is fully completed.

As seen from the foregoing, the vacuum cleaner according to the present invention is mounted with an AC electric cord to perform the cleaning job automatically, manually or by a remote controller.

Furthermore, because the cleaner according to the present invention can be continuously supplied with power when the cleaner performs the cleaning job automatically, manually or by remote controller, only minimal effect by the user is needed.

Because the cleaning area is covered by the establishment of a standard surface defined by one of the interior wall surfaces in the cleaning area, no uncleaned area is left behind so that the whole cleaning area can be completely cleaned.

Particularly, the AC electric cord, regardless of a distance between the cleaner and the power supply point, can maintain a predetermined force of tension to thereby enable the cleaner to perform the cleaning job smoothly.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of controlling a self-propelled, self-directed vacuum cleaner, and maintaining a substantially constant tension on an electric power supply cord of the vacuum cleaner as the power cord is extended from and retracted onto a reel, the method comprising the steps of:

A) actuating an object detecting mechanism disposed on the vacuum cleaner for detecting a reference surface in a room being cleaned and for detecting obstacles in a path of travel of the vacuum cleaner;

B) driving drive wheels disposed on the vacuum cleaner to advance the vacuum cleaner along a path spaced at a substantially constant distance from the reference surface in the absence of detected obstacles in the path of travel;

C) selectively driving the drive wheels to steer the vacuum cleaner away from detected obstacles; D) connecting an outer end of a spiral plate spring to the reel, so that during steps B and C the outer portion of the plate spring is wound up during extension of the cord from the reel and is unwound during retraction of the cord onto the reel;

E) connecting an inner end of the plate spring to a reversible motor;

F) sensing the rotation direction of the reel; and

G) actuating the motor in the same direction as the reel to unwind the inner portion of the spring during extension of the cord and wind up the inner portion of the plate spring during retraction of the cord.

* * * * *